(12) United States Patent
Hughes et al.

(10) Patent No.: US 11,934,905 B2
(45) Date of Patent: Mar. 19, 2024

(54) TOUCH-SENSITIVE CARD SECURITY (71) Applicant: International Business Machines Corporation, Armonk, NY (US)

(72) Inventors: Joseph Hughes, Durham, NC (US); Christopher Douglas Hanudel, Essex Junction, VT (US); Saurabh Yadav, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/543,783

(22) Filed: Dec. 7, 2021

(65) Prior Publication Data

US 2023/0177304 A1 Jun. 8, 2023

(51) Int. Cl.
*G06K 19/18* (2006.01)
*G06K 19/077* (2006.01)
*G06Q 20/34* (2012.01)

(52) U.S. Cl.
CPC ....... *G06K 19/18* (2013.01); *G06K 19/07769* (2013.01); *G06Q 20/341* (2013.01)

(58) Field of Classification Search
CPC ..................................................... G06K 19/18
USPC ............................................................ 235/487
See application file for complete search history.

(56) References Cited

U.S. PATENT DOCUMENTS

| 7,044,368 B1 | 5/2006 | Barron |
| 8,873,147 B1 | 10/2014 | Rhodes |
| 2005/0001711 A1 * | 1/2005 | Doughty ................ G07C 9/257 340/5.82 |
| 2006/0075250 A1 | 4/2006 | Liao |
| 2009/0083850 A1 | 3/2009 | Fadell |
| 2011/0047036 A1 | 2/2011 | Foran-Owens |
| 2011/0283241 A1 | 11/2011 | Miller |
| 2013/0113606 A1 | 5/2013 | Etheridge |

(Continued)

FOREIGN PATENT DOCUMENTS

| CN | 102750571 B | 10/2012 |
| WO | 2015049317 W | 4/2015 |

OTHER PUBLICATIONS

Khast, Negar, "Overview of Radio Frequency Identification: Security Issues and Suggesting a Solution", Helsinki Metropolia University of Applied Sciences, Bachelor Degree, Information Technology, Feb. 13, 2017, 48 pages.

(Continued)

*Primary Examiner* — Rafferty D Kelly
(74) *Attorney, Agent, or Firm* — Stosch Sabo (57) ABSTRACT

A method can include obtaining contact data corresponding to a set of contacts of an authorization card. The contact data can indicate a set of engaged contacts among the set of contacts. The method can include obtaining activation data corresponding to a set of predetermined engaged contacts among the set of contacts. The method can include determining, by comparing the contact data to the activation data, that the set of engaged contacts matches the set of predetermined engaged contacts. The method can include changing, in response to the determining, a state of the authorization card from an inactive state to an active state. The method can include permitting, in response to the changing the state, an electronic transfer of authorization data from the authorization card.

20 Claims, 7 Drawing Sheets

(56) References Cited

U.S. PATENT DOCUMENTS

| | | | |
|---|---|---|---|
| 2014/0074696 A1* | 3/2014 | Glaser | G06F 21/32 726/19 |
| 2014/0263627 A1 | 9/2014 | Wyatt | |
| 2017/0289127 A1 | 10/2017 | Hendrick | |
| 2019/0179438 A1* | 6/2019 | Benkley, III | G06F 3/044 |

OTHER PUBLICATIONS

Leftheriotis, Ioannis, "User Authentication in a Multi-touch Surface: A Chord Password System", CHI 2013: Changing Perspectives, Paris, France, Extended Abstracts, Apr. 27-May 2, 2013, pp. 1725-1730.

Sun et al., "Dissecting pattern unlock: The effect of pattern strength meter on pattern selection", Journal of Information Security and Applications, Nov. 9, 2014, pp. 308-320, http://dx.doi.org/10.1016/j.jisa.2014.10.009.

Takada et al., "Extended PIN Authentication Scheme Allowing Multi-Touch Key Input", Proceedings of International Conference on Advances in Mobile Computing & Multimedia, MoMM 2013, Dec. 2-4, 2013, Vienna, Austria, 4 pages.

International Search Report and Written Opinion for Application PCT/EP2022/083863, dated Feb. 13, 2023, 11 pages.

\* cited by examiner

TOUCH-SENSITIVE CARD SECURITY

BACKGROUND

The present disclosure relates to data security, and more specifically, to data security for authorization cards.

Authorization cards, such as credit cards, debit cards, badges, and identification cards can be utilized for activities such as authorizing financial transactions and gaining access to facilities. Such authorization cards can include security features.

SUMMARY

According to embodiments of the present disclosure, a method can include obtaining contact data corresponding to a set of contacts of an authorization card. The contact data can indicate a set of engaged contacts among the set of contacts. The method can further include obtaining activation data corresponding to a set of predetermined engaged contacts among the set of contacts. The method can further include determining, by comparing the contact data to the activation data, that the set of engaged contacts matches the set of predetermined engaged contacts. The method can further include changing, in response to the determining, a state of the authorization card from an inactive state to an active state. The method can further include permitting, in response to the changing the state, an electronic transfer of authorization data from the authorization card.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data security; more particular aspects relate to touch-sensitive data security for authorization cards. While the present disclosure is not necessarily limited to such applications, various aspects of the disclosure may be appreciated through a discussion of various examples using this context.

An authorization card can refer to a physical card (e.g., a credit card or a debit card) that can be used to authorize a transaction. An authorization card can also refer to a physical card (e.g., a badge or an identification card) that can be used to gain access to one or more systems. Such systems can refer to entities to which access can be restricted, such as a physical structure (e.g., a secure building) and/or an electronic framework (e.g., a secure computing network). In some instances, an authorization card can electronically transfer authorization data. Authorization data can refer to information stored on the authorization card (e.g., an owner name, account information, encryption key data, one or more serial numbers, access codes, passwords, etc.) with which the authorization card can electronically authorize a transaction or permit access to one or more systems.

In some instances, an authorization card can employ Radio Frequency Identification (RFID) technology to electronically transfer authorization data. In an example, an authorization card can include an integrated circuit (e.g., a tag integrated circuit) in electrical communication with an antenna. The integrated circuit can be configured to store authorization data. Such an authorization card can electronically transfer authorization data to a discrete second device (e.g., a RFID reader) via radio waves emitted from the antenna. Such a RFID reader can include a device such as a point-of-sale (POS) terminal of a merchant or retailer, or a badge reader associated with a physical point of entry (e.g., a building door) or an electronic point of entry (e.g., a computer network). In some instances, the authorization card can be passive, such that the authorization card can use power it receives from a RFID reader to transfer the authorization data to the RFID reader. In some instances, the authorization card can be active, such that the authorization card includes a power source, such as a battery, that the authorization card can use to transfer the authorization data to the RFID reader.

In some instances, an authorization card can be susceptible to fraudulent activity. For example, in a case in which an authorization card is a credit card, a malicious actor can use a handheld RFID reader to surreptitiously acquire authorization data from the credit card of an unwitting owner. In this case, the malicious actor can use the authorization data to initiate fraudulent purchases. In a case in which an authorization card is a badge or identification card that is lost or stolen, a person possessing the badge or identification card can attempt to gain improper access to a facility or computing network.

To address these and other challenges, embodiments of the present disclosure include a touch-sensitive authorization card (TSAC). A TSAC can be an authorization card that is configured to transition between an active state, in which the TSAC is permitted to electronically transfer authorization data, and an inactive state, in which the TSAC is prevented from electronically transferring the authorization data. In some embodiments, the TSAC can change from an inactive state to an active state based on a manner in which a set of touch-sensitive contacts disposed on the TSAC is engaged. For example, in some embodiments a TSAC can have a default inactive state, and in response to a user engaging (e.g., touching or pressing) a first subset of a set touch-sensitive contacts disposed on the TSAC, the TSAC can transition from the default inactive state to an active state. Thus, in some embodiments, the TSAC can condition an electronic transfer of authorization data from the TSAC on a valid engagement of the touch-sensitive contacts disposed on the TSAC.

Accordingly, embodiments of the present disclosure can improve authorization card security. For example, in some embodiments, a TSAC in an inactive state can be undetected by a RFID reader. The lack of detection can prevent a surreptitious acquisition of authorization data, such as that described above. Furthermore, in some embodiments, by maintaining an inactive state as a default state, the TSAC can reduce an occurrence of unintentional transfers of authorization data. Additionally, in some embodiments, a lost or stolen TSAC can provide additional security against fraudulent activity, as it would remain inactive absent a valid engagement of the touch-sensitive contacts by a wrongful possessor.

Figure 1A:
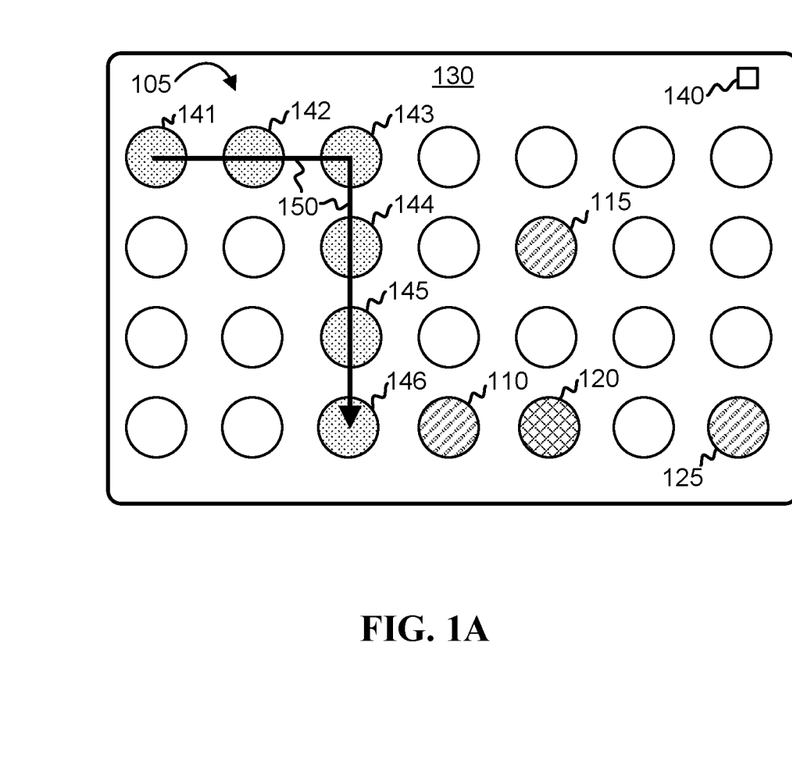
FIG. 1A depicts an example touch-sensitive authorization card having contacts on opposite surfaces, in accordance with embodiments of the present disclosure.
Figure 1B:
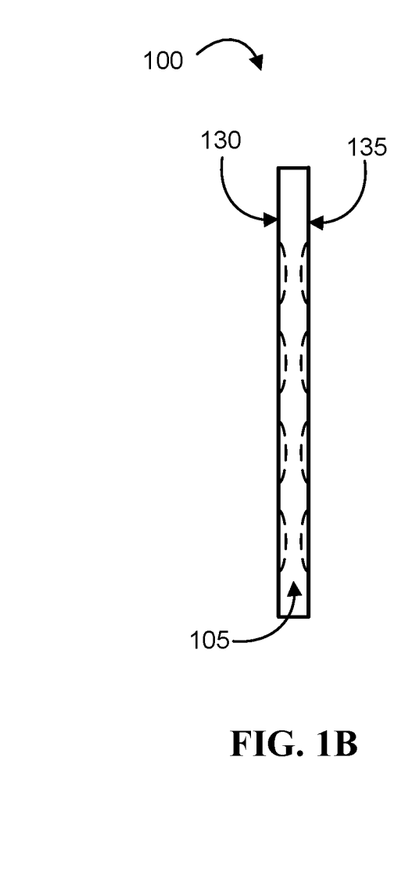
FIG. 1B depicts a side view of FIG. 1A.
Figure 3:
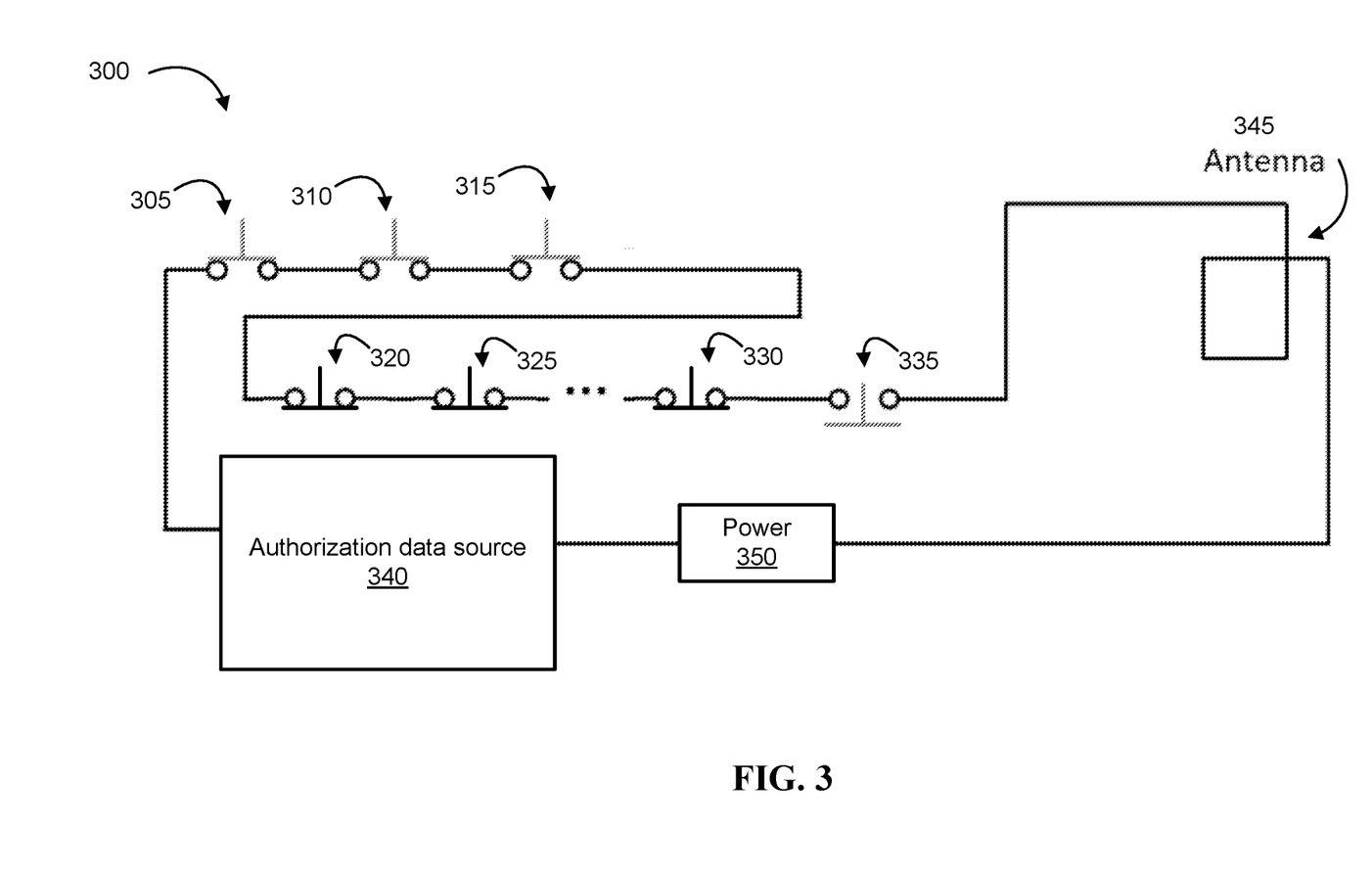
FIG. 3 depicts an example circuit diagram of an example touch-sensitive authorization card, in accordance with embodiments of the present disclosure.
Figure 4:
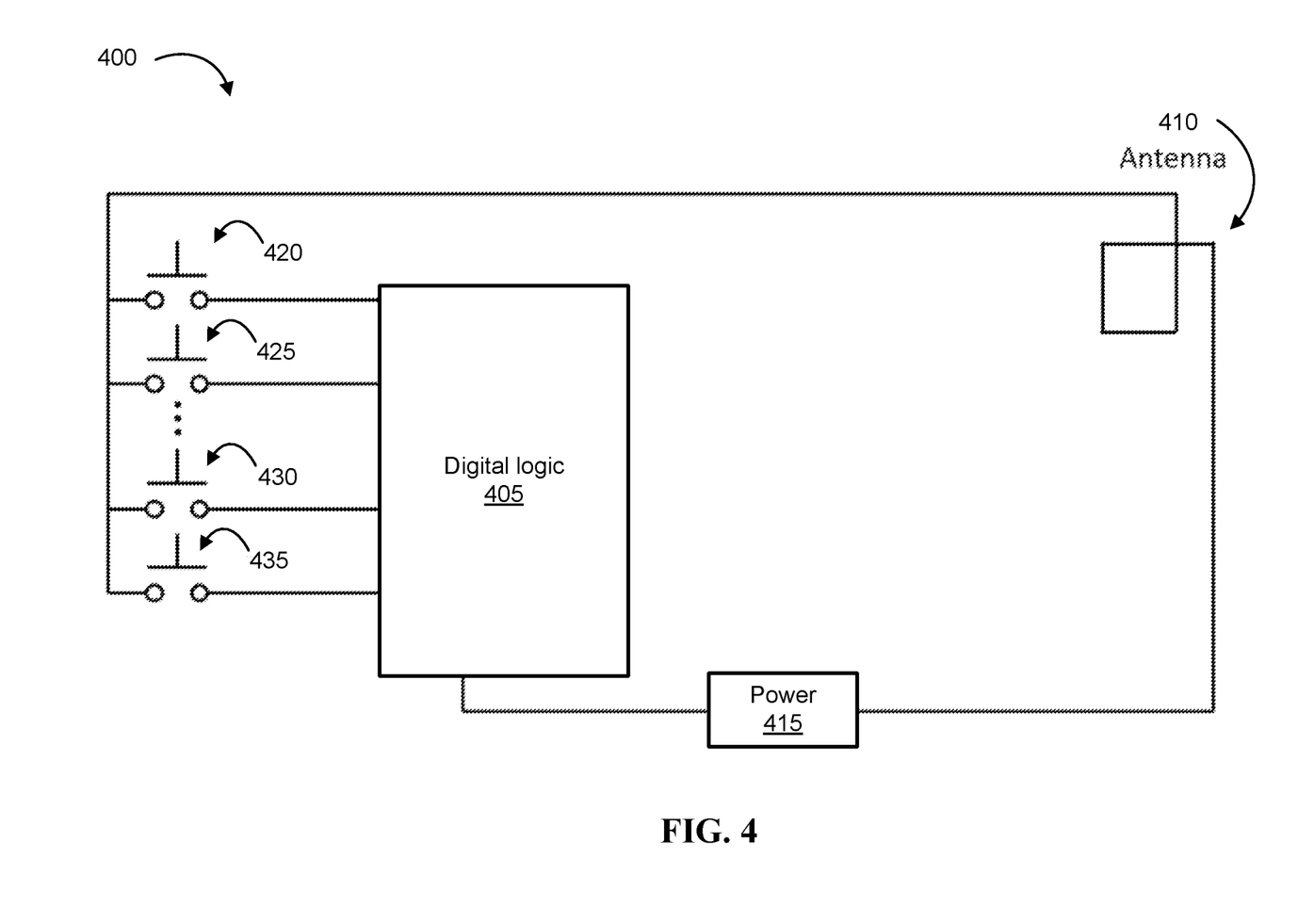
FIG. 4 depicts an example circuit diagram of an example touch-sensitive authorization card having digital logic, in accordance with embodiments of the present disclosure.
Figure 5:
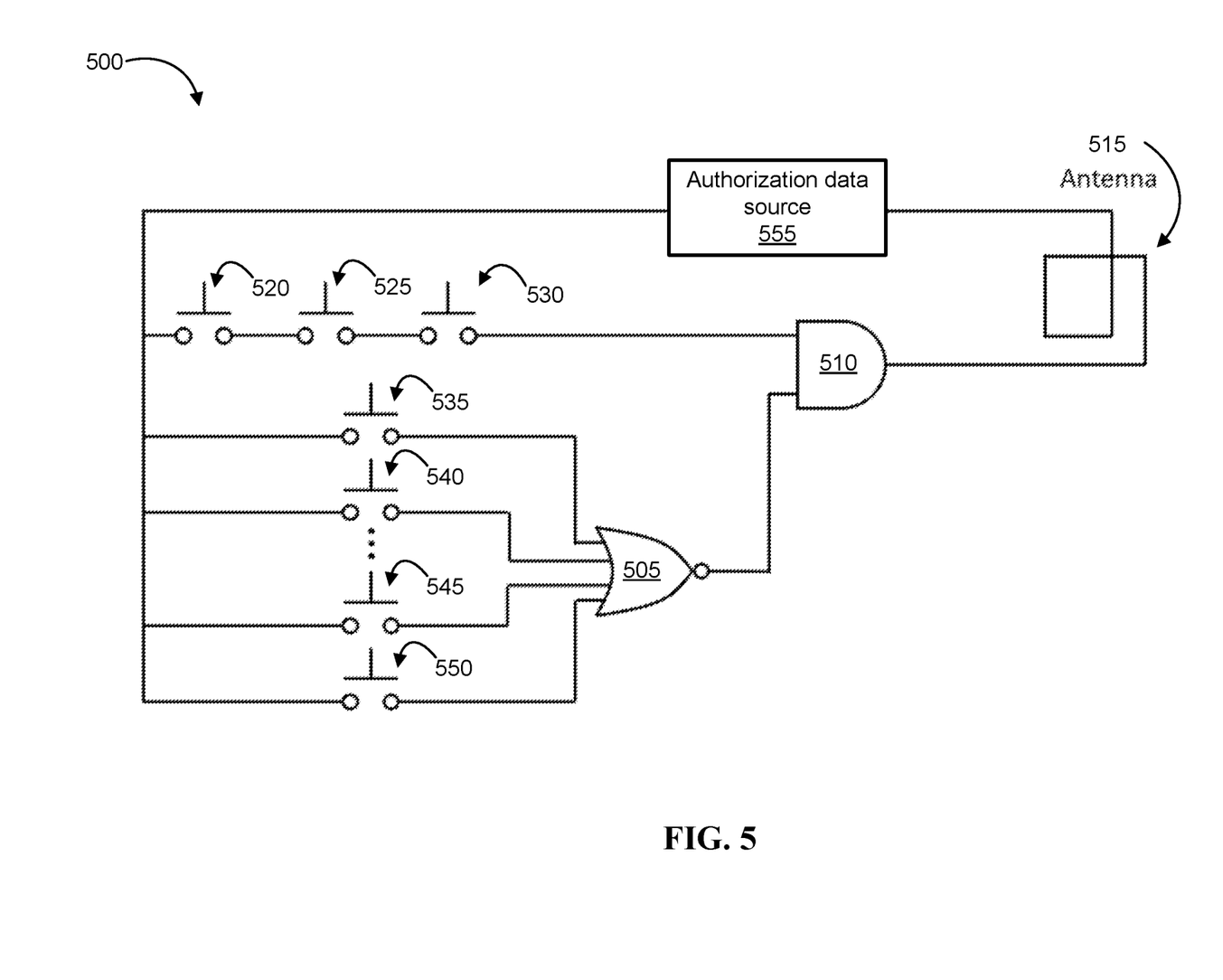
FIG. 5 depicts an example circuit diagram of an example touch-sensitive authorization card having an AND gate and a NOR gate, in accordance with embodiments of the present disclosure.

Turning to the figures, FIGS. 1A and 1B illustrate a front view and a side view of an example TSAC 100, in accordance with embodiments of the present disclosure. In some embodiments, TSAC 100 can be a financial transaction card, such as a credit or debit card. In these embodiments, TSAC 100 can be configured to electronically transmit a signal to authorize a financial transaction, such as a payment or a transfer of funds. In some embodiments, TSAC 100 can be an access card, such as a badge or an identification card. For example, TSAC 100 can be configured to electronically transmit a signal to permit access to one or more systems, such as a computing device, a secure location (e.g., a locked room or building), and/or a computer network. In some embodiments, TSAC 100 can implement active and/or passive RFID technology (as described above) to electronically transfer authorization data. In some embodiments, TSAC 100 can be configured in the same or in a substantially similar manner to the TSAC configurations discussed with respect to FIGS. 3-5. In some embodiments, TSAC 100 can include digital logic, a power source, an authorization data source, and/or an antenna (these components are not shown in FIGS. 1A and 1B, but are shown in FIGS. 3-5). In some embodiments, TSAC 100 can be configured to perform method 600, FIG. 6.

Turning back to FIGS. 1A and 1B, TSAC 100 can include a set of contacts 105 disposed on a first surface 130 and on a second surface 135 of TSAC 100. As shown in FIG. 1B, first surface 130 and second surface 135 are opposite surfaces of TSAC 100. TSAC 100 includes a total of 56 contacts 105. 28 contacts 105 are disposed on first surface 130 and 28 contacts 105 are disposed on second surface 135. Each contact 105 can include a touch-responsive device, such as switches 320, 420, and 520 discussed with respect to FIGS. 3-5. Contacts 105 are recessed with respect to first surface 130 and second surface 135. Such a recessed configuration can reduce inadvertent engagement (e.g., touching or pressing) of contacts 105. The recessed configuration can be advantageous in cases in which TSAC 100 is a credit card or a debit card, as these cards may frequently be sandwiched between other cards when stored in a compartment such as a wallet. Accordingly, a TSAC 100 in the form of a credit card or a debit card can be particularly susceptible to inadvertent touching or pressing of contacts.

In some embodiments, TSAC 100 can include a first subset of predetermined engaged contacts 110, 115, 125 among the set of contacts 105. The first subset is discussed in the first example below. In some embodiments, TSAC 100 can include a second subset of predetermined engaged contacts 141-146. The second subset is discussed in the second example below.

A predetermined engaged contact can refer to a contact configured to change the state of TSAC 100 from an inactive state to an active state in response to being touched or pressed in accordance with a predetermined engagement pattern and/or predetermined engagement sequence. A predetermined engagement pattern can refer to a manner of touching or pressing one or more predetermined engaged contacts (e.g., simultaneously). A predetermined engagement sequence can refer to a successive order in which one or more predetermined engaged contacts are touched or pressed.

In a first example, in some embodiments, contacts 110, 115, and 125 can be predetermined engaged contacts. These predetermined engaged contacts can be associated with a predetermined engagement pattern, such as simultaneously touching only contacts 110, 115, and 125 among the set of contacts 105. Thus, in this example, a user can change the state of TSAC 100 from an inactive state to an active state by simultaneously touching only contacts 110, 115, and 125. Additionally, in this example, the remaining 53 contacts among the set of contacts 105 (i.e., the contacts other than contacts 110, 115, and 125) are predetermined unengaged contacts. A predetermined unengaged contact can refer to a contact configured to permit the state of the TSAC 100 to change from an inactive state to an active state in response to not being engaged (e.g., touched or pressed) in accordance with a predetermined engagement pattern and/or a predetermined engagement sequence. Thus, in this example, in the case that a user simultaneously presses contact 120 in addition to contacts 110, 115, and 125, the engagement of contact 120 (a predetermined unengaged contact) will prevent the state of TSAC 100 from changing to an active state from an inactive state. By acknowledging predetermined unengaged contacts, embodiments of the present disclosure can increase a security level associated with TSAC 100 by preventing TSAC 100 from changing to an active state in response to a user simultaneously engaging the entire set of contacts 105.

In a second example, in some embodiments, contacts 141-146 can be predetermined engaged contacts. These predetermined engaged contacts can be associated with a predetermined engagement sequence, such as touching contacts 141-146 in successive order along path 150 (e.g., swiping one's finger along path 150, beginning at contact 141 and ending at contact 146). In this example, the state of TSAC 100 can change from an inactive state to an active state in response to a user touching contacts 141-146 as discussed above.

Embodiments of the present disclosure can include alternate quantities, sizes, shapes, and positions of contacts 105. For example, in some embodiments, contacts 105 can have two or more shapes (e.g., a first subset of contacts 105 can have a triangular shape and a second subset of contacts 105 can have a square shape). In some embodiments, contacts 105 can include indicia such as colored markings, symbols, and/or alphanumeric characters. Such features can facilitate a user's ability to recall and/or implement a predetermined engagement pattern and/or sequence. In some embodiments, TSAC 100 can include one or more features discussed with respect to TSAC 200, FIGS. 2A and 2B, and vice versa.

In some embodiments, TSAC 100 can include an audio and/or visual indicator 140, such as a light-emitting diode (LED) and/or a speaker. Indicator 140 can be configured to emit an audio or visual indication corresponding to a change in the state of TSAC 100. For example, in some embodiments, indicator 140 can be configured to emit light, such as a green-colored light, in response to TSAC 100 changing from an inactive state to an active state. In some embodiments, indicator 140 can be configured to emit such a light until TSAC 100 returns to the inactive state from the active state. In some embodiments, indicator 140 can be configured to blink in accordance with such a change in state. For example, indicator 140 can be configured to emit one or more blinks of green light in response to TSAC 100 changing from an inactive state to an active state, and to emit one or more blinks of red light in response to TSAC 100 changing from an active state to an inactive state. Similarly, in some embodiments, indicator 140 can be configured to emit one or more beeping sounds in response to a change in the state of TSAC 100. In some embodiments, TSAC 100 can include a plurality of indicators 140.

Figure 2A:
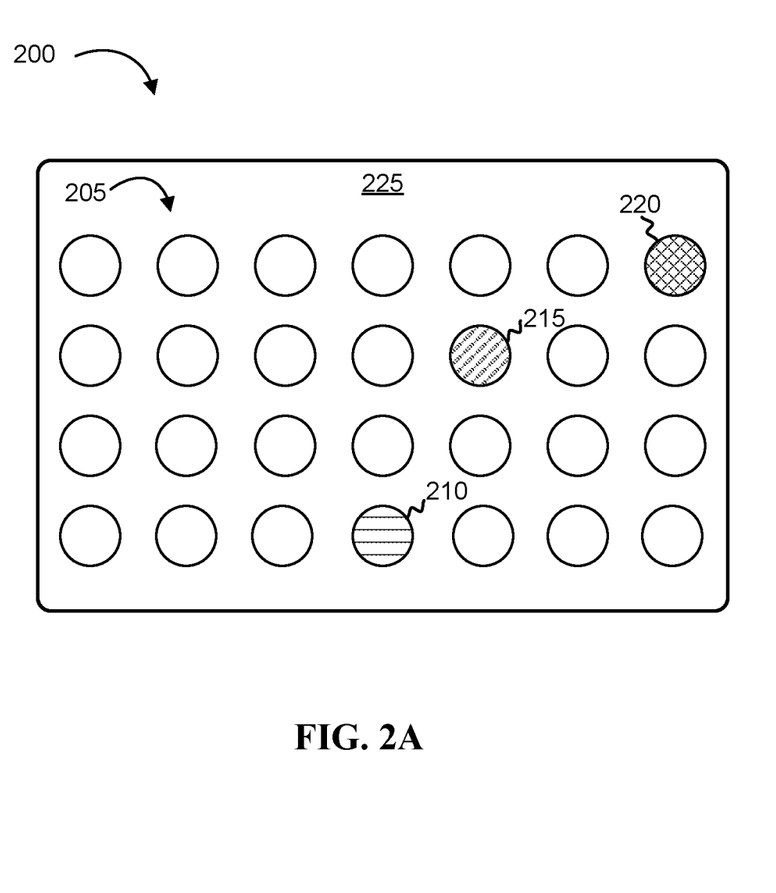
FIG. 2A depicts an example touch-sensitive authorization card having contacts on a first surface, in accordance with embodiments of the present disclosure.
Figure 2B:
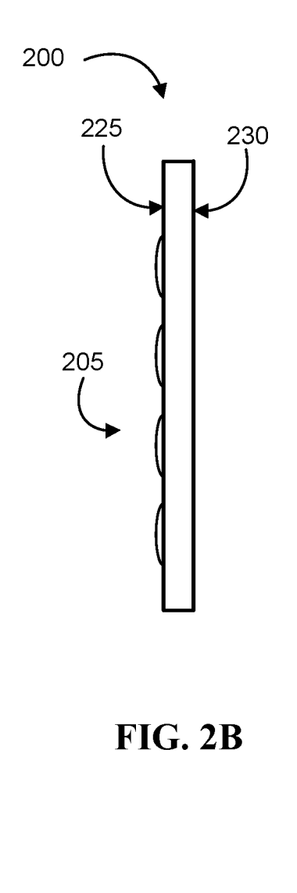
FIG. 2B depicts a side view of FIG. 2A.

FIGS. 2A and 2B illustrate a front view and a side view of an example TSAC 200 in accordance with embodiments of the present disclosure. In some embodiments, TSAC 200 can include one or more features discussed with respect to TSAC 100, FIGS. 1A and 1B. In some embodiments, TSAC 200 can be configured in the same or in a substantially similar manner to the TSAC configurations discussed with respect to FIGS. 3-5. In some embodiments, TSAC 200 can include digital logic, a power source, an authorization data source, and/or an antenna (these components are not shown in FIGS. 2A and 2B, but are shown in FIGS. 3-5). In some embodiments, TSAC 200 can be configured to perform method 600, FIG. 6.

Turning back to FIGS. 2A and 2B, TSAC 200 can include contacts 205 disposed on a first surface 225 and not disposed on a second surface 230 opposite the first surface 225. Such a configuration can be beneficial in instances when TSAC 200 is primarily accessible on one side, such as when TSAC 200 is in the form of a workplace ID that is retained in a holding receptacle of a user. Each contact 205 can include a touch-responsive sensor, such as switches 320, 420, and 520 discussed with respect to FIGS. 3-5. Contacts 205 protrude from first surface 225, which can facilitate a user's ability to press contacts 205.

In some embodiments, TSAC 200 can include a subset of predetermined engaged contacts 210, 215, and 220 among the set of contacts 205. These predetermined engaged contacts can be associated with a predetermined engagement pattern and a predetermined engagement sequence. For example, such a predetermined engagement pattern can include pressing each of the predetermined engaged contacts 210, 215, and 220 twice. Additionally in this example, the predetermined engagement sequence can include pressing the predetermined engaged contacts 210, 215, and 220 in successive order. Accordingly, in this example, the state of TSAC 200 can change from an inactive state to an active state in response to a user pressing predetermined engaged contact 210 twice, followed by pressing predetermined engaged contact 215 twice, followed by pressing predetermined engaged contact 220 twice.

FIG. 3 depicts an example circuit diagram of an example TSAC 300, in accordance with embodiments of the present disclosure. In some embodiments, TSAC 300 can correspond to TSAC 100, FIGS. 1A and 1B, and in some embodiments, TSAC 300 can correspond to TSAC 200, FIGS. 2A and 2B.

Turning back to FIG. 3, TSAC 300 can include a set of normally-open switches 305, 310, and 315, as well as a set of normally-closed switches 320, 325, 330, and 335. In some embodiments, such switches can correspond to contacts 105, FIGS. 1A and 1B and/or to contacts 205, FIGS. 2A and 2B. For example, in some embodiments, normally-open switch 305 can be included in contact 110, FIG. 1A; normally-open switch 310 can be included in contact 115, FIG. 1A; normally-open switch 315 can be included in contact 125, FIG. 1A; and normally-closed switch 335 can be included in contact 120, FIG. 1A. In this example, normally-open switches 305, 310, and 315 can correspond to predetermined engaged contacts and normally-closed switches 320, 325, 330, and 335 can correspond to predetermined unengaged contacts. Accordingly, in response to a user simultaneously engaging (e.g., touching or pressing) only normally-open switches 305, 310, and 315, TSAC 300 can form a closed circuit. Such a closed circuit can correspond to TSAC 300 having an active state in which it can electronically transfer authorization data by antenna 345 from authorization data source 340. In contrast, in response to a user simultaneously engaging normally-closed switch 335 in addition to normally-open switches 305, 310, and 315, TSAC 300 can form an open circuit. Such an open circuit can correspond to TSAC 300 having an inactive state in which it is prevented from electronically transferring authorization data by antenna 345.

In some embodiments, authorization data source 340 can include a RFID tag integrated circuit. In some embodiments, TSAC 300 can include power source 350. In these embodiments, power source 350 can allow TSAC 300 to implement an active RFID transfer of authorization data and/or allow TSAC 300 to activate an indicator, such as indicator 140, FIG. 1A. In some embodiments, the set of normally-open switches 305, 310, and 315 and the set of normally-closed switches 320, 325, 330, and 335 can include switches such as push-button switches, capacitive touch switches, and/or resistive touch switches.

FIG. 4 depicts an example circuit diagram of an example TSAC 400 having digital logic 405, in accordance with embodiments of the present disclosure. In some embodiments, TSAC 400 can correspond to TSAC 100, FIGS. 1A and 1B, and in some embodiments, TSAC 400 can correspond to TSAC 200, FIGS. 2A and 2B. In some embodiments, digital logic 405 can include a microprocessor and have one or more features of the computer system 701, FIG. 7. In some embodiments, digital logic 405 can include a comparator and an authorization data source, such as read-only memory (ROM), that can store authorization data. In some embodiments, digital logic 405 can include one or more AND gates and/or one or more NOR gates, such as those discussed with respect to FIG. 5. In some embodiments, digital logic 405 can store authorization data. In some embodiments, digital logic 405 can be configured to perform one or more operations of method 600, FIG. 6.

In some embodiments, TSAC 400 can include a set of switches 420, 425, 430, and 435. In some embodiments, switches 420, 425, 430, and 435 can be the same or substantially similar to the switches described with respect to FIG. 3. In some embodiments, switches 420, 425, 430, and 435 can correspond to contacts 105, FIGS. 1A and 1B and/or to contacts 205, FIGS. 2A and 2B. For example, in some embodiments, the set of switches 420, 425, 430, and 435 can be included in contacts 105, FIGS. 1A and 1B and/or contacts 205, FIGS. 2A and 2B. In some embodiments, a state of TSAC 400 can be configured to change between an inactive state and an active state in accordance with method 600, FIG. 6. In some embodiments, TSAC 400 can include power source 415. In these embodiments, power source 415 can allow TSAC 400 to implement an active RFID transfer of authorization data and/or allow TSAC 400 to activate an indicator, such as indicator 140, FIG. 1A.

In some embodiments, TSAC 400 can have an inactive state when a circuit that includes digital logic 405 and antenna 410 is an open circuit. Such an open circuit can prevent TSAC 400 from electronically transferring authorization data by antenna 410 from digital logic 405. In some embodiments, TSAC 400 can have an active state when a circuit that includes digital logic 405 and antenna 410 is a closed circuit. Such a closed circuit can permit TSAC 400 to electronically transfer authorization data by antenna 410 from digital logic 405.

FIG. 5 depicts an example circuit diagram of an example TSAC 500 having digital logic in the form of AND gate 510 and NOR gate 505, in accordance with embodiments of the present disclosure. In some embodiments, such digital logic can be configured to perform method 600, FIG. 6. In some embodiments, TSAC 500 can correspond to TSAC 100, FIGS. 1A and 1B, and in some embodiments, TSAC 500 can correspond to TSAC 200, FIGS. 2A and 2B.

In some embodiments, TSAC 500 can include normally-open switches 520-550. In some embodiments, normally-open switches 520-550 can include switches such as push-button switches, capacitive touch switches, and/or resistive touch switches. In some embodiments, normally-open switches 520-550 can correspond to contacts 105, FIGS. 1A and 1B and/or to contacts 205, FIGS. 2A and 2B. For example, in some embodiments, normally-open switch 520 can be included in contact 110, FIG. 1A; normally-open switch 525 can be included in contact 115, FIG. 1A; normally-open switch 530 can be included in contact 125, FIG. 1A; and normally-open switch 545 can be included in contact 120, FIG. 1A. In this example, normally-open switches 520, 525, and 530 can correspond to predetermined engaged contacts, and normally-open switches 535-550 can correspond to predetermined unengaged contacts. Accordingly, AND gate 510 and NOR gate 505 can have truth tables configured such that in response to a user simultaneously engaging (e.g., touching or pressing) only normally-open switches 520, 525, and 530, TSAC 500 can change from an inactive state to an active state. In the active state, TSAC 500 can electronically transfer authorization data by antenna 515 from authorization data source 555 (e.g., ROM) that stores authorization data. In contrast, such truth tables corresponding to AND gate 510 and NOR gate 505 can be configured such that in response to a user engaging one or more normally-open switches 535-550 while simultaneously engaging normally-open switches 520, 525, and 530, TSAC 500 can be prevented from changing from an inactive state to an active state. In the inactive state, TSAC 500 can be unable to electronically transfer authorization data by antenna 515.

Figure 6:
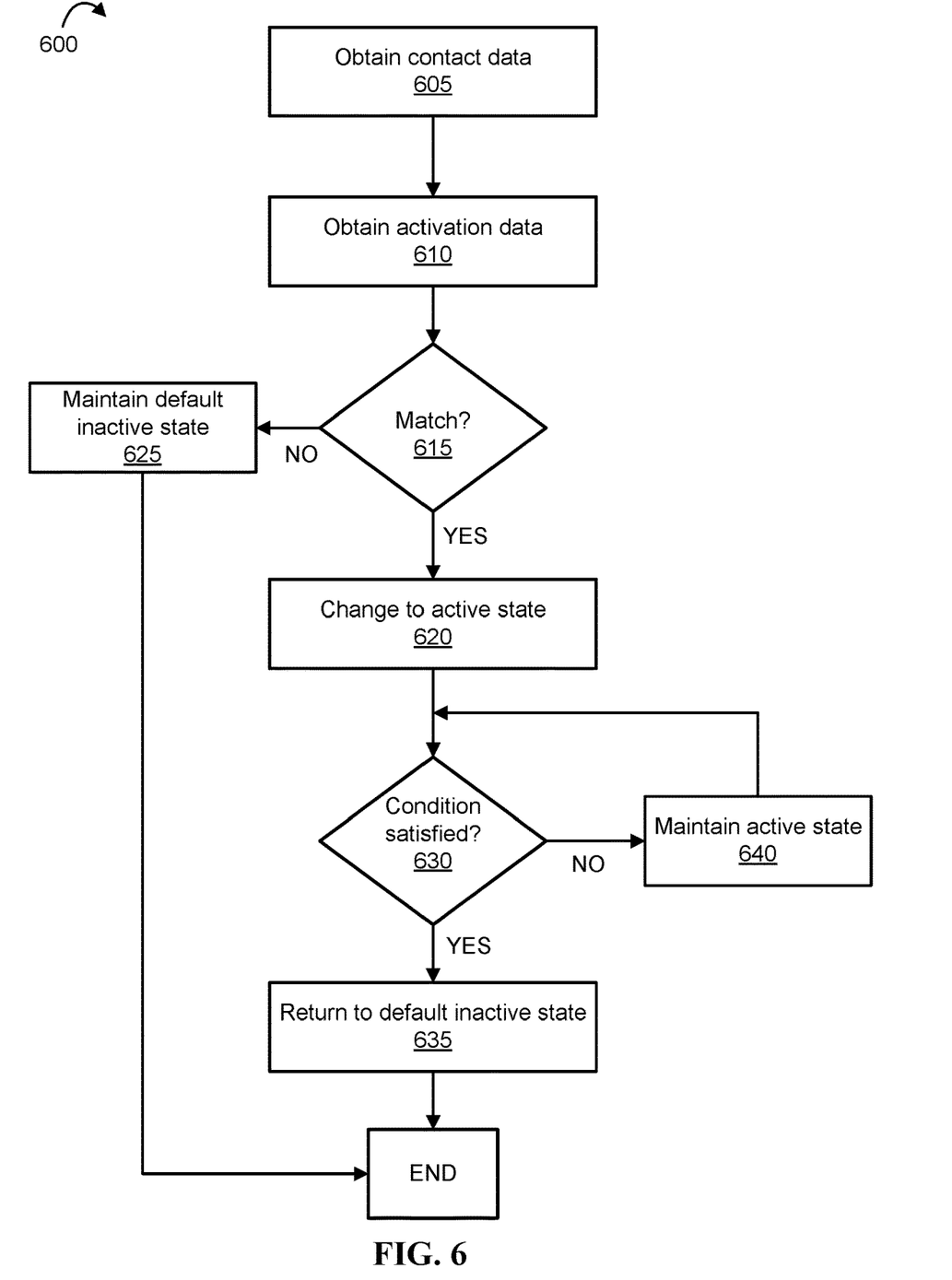
FIG. 6 depicts a flowchart of an example method for implementing authorization card security, in accordance with embodiments of the present disclosure.

FIG. 6 depicts a flowchart of an example method 600 for implementing authorization card security, in accordance with embodiments of the present disclosure. The method 600 can be implemented by digital logic (e.g., digital logic 405, FIG. 4) and/or a processor of a TSAC, such as a processor described with respect to computer system 701, FIG. 7.

Referring back to FIG. 6, in operation 605, the TSAC can obtain contact data from a set of contacts disposed on the TSAC. Contact data can refer to information corresponding to a position and/or an engagement status of one or more contacts among the set of contacts disposed on the TSAC. For example, in some embodiments, each contact of the set of contacts can have an identifiable position. For example, in some embodiments, the set of contacts can be disposed on the TSAC in a grid having four rows of contacts and seven columns of contacts. In this example, a first contact in the first row and the first column of the grid can be associated with the position (1, 1). Further in this example, a second contact in the second row and the seventh column of the grid can be associated with the position (2, 7). Continuing with this example, the TSAC can be configured to associate a "1" with a contact that is engaged (e.g., touched by a user) and to associate a "0" with a contact that is unengaged (e.g., not touched by the user). Continuing with this example, in the event that the first contact is engaged and the second contact is unengaged, the contact data can include (1, 1, 1), indicating the position and engaged status of the first contact. Such contact data can further include (2, 7, 0), indicating the position and unengaged status of the second contact.

In some embodiments, the contact data can include sequence information corresponding to a successive order in which contacts among the set of contacts are engaged. For example, in some embodiments, a user can simultaneously press first and second contacts; shortly thereafter, the user can press a third contact; and shortly thereafter again, the user can press the first contact again. In this example, the contact data can include information such as a set of timestamps indicating the times at which each contact was pressed.

In some embodiments, the contact data can include information corresponding to one or more parameters associated with contacts among the set of contacts. For example, in embodiments in which the set of contacts includes one or more capacitance sensors, the contact data can include capacitance values that are obtained by such capacitance sensors and correspond to one or more contacts among the set of contacts. In another example, in embodiments in which the set of contacts includes one or more resistance sensors, the contact data can include resistance values that are obtained by such resistance sensors and correspond to one or more contacts among the set of contacts.

By obtaining a variety of categories of contact data such as those described above, embodiments of the present disclosure can detect a plurality of combinations of engagements of the set of contacts disposed on the TSAC. Such a plurality can increase a security level associated with the TSAC.

In operation 610, the TSAC can obtain activation data. In some embodiments, activation data can include information corresponding to a predetermined engagement pattern and/or predetermined engagement sequence that can be used to change the state of the TSAC from an inactive state to an active state. In some embodiments, the activation data can include the same or substantially similar categories of information discussed above with respect to the contact data. Thus, in some embodiments the activation data can include information corresponding to a position and/or an engagement status of one or more contacts among the set of contacts disposed on the TSAC; in some embodiments, the activation data can include sequence information corresponding to a successive order in which contacts among the set of contacts are engaged; and in some embodiments, the activation data can include information corresponding to one or more parameters associated with contacts among the set of contacts.

In some embodiments, the activation data can be included in digital logic and/or memory of the TSAC. In some embodiments, operation 610 can include the digital logic and/or a processor of the TSAC retrieving activation data from a storage location. In some embodiments, activation data can be selected by an entity such as a user or a provider associated with the TSAC (e.g., a credit card company issuing the TSAC in the form of a credit card, an employer issuing a TSAC in the form of a workplace ID, or an affiliate of such entities).

For example, in some embodiments, a credit card company can issue a customer a TSAC having activation data stored in memory of the TSAC. Such activation data can indicate that the TSAC can be changed from a default inactive state to an active state in response to only two specific contacts of the TSAC being touched simultaneously. These two specific contacts can be referred to as predetermined engaged contacts, as they are configured to change the state of the TSAC from an inactive state to an active state. In some embodiments, the credit card company can convey such information to such a customer in a confidential manner so that the customer can change the TSAC from an inactive state to an active state at his or her discretion.

In some embodiments, the activation data can include a set of predetermined engagement patterns and/or predetermined engagement sequences that can be used to change the state of the TSAC from an inactive state to an active state. In these embodiments, each of the predetermined engagement patterns and/or predetermined engagement sequences can have a respective validity period. Continuing with the example above, in some embodiments the activation data can include the aforementioned engagement pattern of only 2 specific contacts of the TSAC being touched simultaneously (a first engagement pattern) having a validity period of a first month (e.g., January). In this example, the activation data can further include a second engagement pattern of only 2 different specific contacts of the TSAC being touched simultaneously having a validity period of a second month subsequent to the first month (e.g., February). Continuing with this example, the activation data can further include a predetermined engagement sequence of 5 specific contacts of the TSAC being touched in successive order having a validity period of a third month subsequent to the second month (e.g., March). Thus, in this example, the TSAC can be configured to have a default inactive state, and during the month of January, the TSAC can be changed from the inactive state to an active state in response to a user touching the contacts of the TSAC in accordance with the first engagement pattern; during the month of February, the TSAC can be changed from the inactive state to an active state in response to a user touching the contacts of the TSAC in accordance with the second engagement pattern; and during the month of March, the TSAC can be changed from the inactive state to an active state in response to a user touching the contacts of the TSAC in accordance with the predetermined engagement sequence.

By including such a set of predetermined engagement patterns and/or predetermined engagement sequences, embodiments of the present disclosure can increase a security level associated with the TSAC.

In operation 615, the TSAC can compare contact data obtained in operation 605 to activation data obtained in operation 610 to determine whether a match is present. In some embodiments, the TSAC can determine that a match is present in response to determining that contact data obtained in operation 605 is the same as or substantially similar to activation data obtained in operation 610. For example, in some embodiments, the activation data can include a predetermined engagement pattern of only 3 specific contacts of the TSAC being touched simultaneously. In this example, in the event that the contact data indicates that the entire set of contacts of the TSAC is simultaneously engaged (e.g., a user simultaneously touches all of the contacts disposed on the TSAC), then the TSAC can determine that a match is not present. In this instance, the TSAC can determine that a match is not present in response to identifying that both predetermined engaged contacts and predetermined unengaged contacts are engaged. Alternatively in this example, in the event that the contact data indicates that only the 3 specific contacts of the TSAC are simultaneously engaged (e.g., a user simultaneously touches the 3 specific contacts), then the TSAC can determine that a match is present. In this instance, the TSAC can determine that a match is present in response to identifying that (1) the set of engaged contacts indicated in the contact data matches the set of predetermined engaged contacts indicated in the activation data, and (2) the set of unengaged contacts indicated in the contact data matches the set of predetermined unengaged contacts indicated in the activation data.

In some embodiments, operation 615 can include the TSAC comparing information such as a position and/or an engagement status of one or more contacts of the TSAC, sequence information, and/or one or more parameters associated with contacts of the TSAC, as discussed with respect to operations 605 and 610.

In some embodiments, the TSAC can include program instructions to count a number of determinations of a match not being present and transition to a disabled state in response to the number exceeding a threshold. For example, in some embodiments, the TSAC can perform six consecutive iterations of method 600, and in each iteration determine in operation 615 that a match is not present. In this example, the TSAC can determine that the 6 consecutive iterations exceeds a threshold of 5 consecutive iterations. In response to this determination, the TSAC can transition to a disabled state in which the TSAC maintains an inactive state regardless of the contact data obtained in operation 605. In this way, embodiments of the present disclosure can increase a security level associated with the TSAC by reducing a likelihood that the TSAC can be changed to an active state by trial and error attempts by a user.

In operation 615, if the TSAC determines that a match is present, then the TSAC can proceed to operation 620. Alternatively, if the TSAC determines that a match is not present, then the TSAC can proceed to operation 625.

In operation 620, in response to determining that a match is present in operation 615, the TSAC can change from an inactive state to an active state. In some embodiments, operation 620 can include the digital logic and/or a processor of the TSAC enabling an antenna of the TSAC such that the TSAC can electronically transfer authorization data. In some embodiments, operation 620 can include the digital logic and/or a processor of the TSAC changing a circuit that includes an antenna of the TSAC from an open circuit to a closed circuit. In some embodiments, operation 620 can include the TSAC activating an indicator, such as indicator 140, FIG. 1A, to indicate the active state.

In operation 625, in response to determining that a match is not present in operation 615, the TSAC can maintain a default inactive state. In some embodiments, operation 625 can include the digital logic and/or a processor of the TSAC maintaining a disabled state of an antenna of the TSAC such that the TSAC is prevented from electronically transferring authorization data. In some embodiments, operation 625 can include the digital logic and/or a processor of the TSAC refraining from changing a circuit that includes an antenna of the TSAC from an open circuit to a closed circuit, such that the antenna is inoperable. In some embodiments, operation 625 can include the TSAC activating an indicator, such as indicator 140, FIG. 1A, to indicate the inactive state.

In operation 630, in response to the TSAC changing from an inactive state to an active state in operation 620, the TSAC can determine if one or more conditions are satisfied. For example, in some embodiments, the digital logic and/or a processor of the TSAC can include program instructions to determine whether an elapsed time corresponding to the TSAC changing from the inactive state to the active state exceeds a threshold. For example, in some embodiments, the TSAC can include program instructions to permit the TSAC to have an active state for a threshold time such as 10 seconds. In this example, in response to determining that an elapsed time following the TSAC changing from the inactive state to the active state exceeds 10 seconds, the TSAC can determine that a condition is satisfied. Alternatively, in this example, in response to determining that such an elapsed time does not exceed 10 seconds, the TSAC can determine that a condition is not satisfied.

By determining if one or more conditions are satisfied in operation 630, embodiments of the present disclosure can facilitate convenient use of the TSAC while increasing a security level associated with the TSAC. For example, in some embodiments, a threshold time, such as the ten-second threshold discussed above, can allow a user sufficient time to complete an activity, such as making a purchase with the TSAC using a retailer's point-of-sale (POS) terminal. As discussed below, upon expiration of the threshold time, the TSAC can return to a default inactive state to limit access to the TSAC's authorization data.

In operation 630, if the TSAC determines that one or more conditions are satisfied, then the TSAC can proceed to operation 635. Alternatively, if the TSAC determines that one or more conditions are not satisfied, then the TSAC can proceed to operation 640.

In operation 635, in response to the TSAC determining that one or more conditions are satisfied in operation 630, the TSAC can transition back to the default inactive state. In some embodiments, operation 635 can include the digital logic and/or a processor of the TSAC implementing program instructions to disable an antenna of the TSAC, such that the TSAC is prevented from electronically transferring authorization data. In some embodiments, operation 635 can include the digital logic and/or a processor of the TSAC changing a circuit that includes an antenna of the TSAC from a closed circuit to an open circuit, resulting in the antenna being inoperable. In some embodiments, operation 635 can include the TSAC activating an indicator, such as indicator 140, FIG. 1A, to indicate the inactive state. Following operation 635, method 600 can end.

In operation 640, in response to the TSAC determining that one or more conditions are not satisfied in operation 630, the TSAC can maintain an active state of the TSAC. In some embodiments, operation 640 can include the digital logic and/or a processor of the TSAC maintaining an enabled state of an antenna of the TSAC such that the TSAC can electronically transfer authorization data. In some embodiments, operation 640 can include the digital logic and/or a processor of the TSAC maintaining a closed-circuit configuration for a circuit that includes an antenna of the TSAC, such that the antenna is operable. In some embodiments, operation 640 can include the TSAC activating an indicator, such as indicator 140, FIG. 1A, to indicate the active state.

Figure 7:
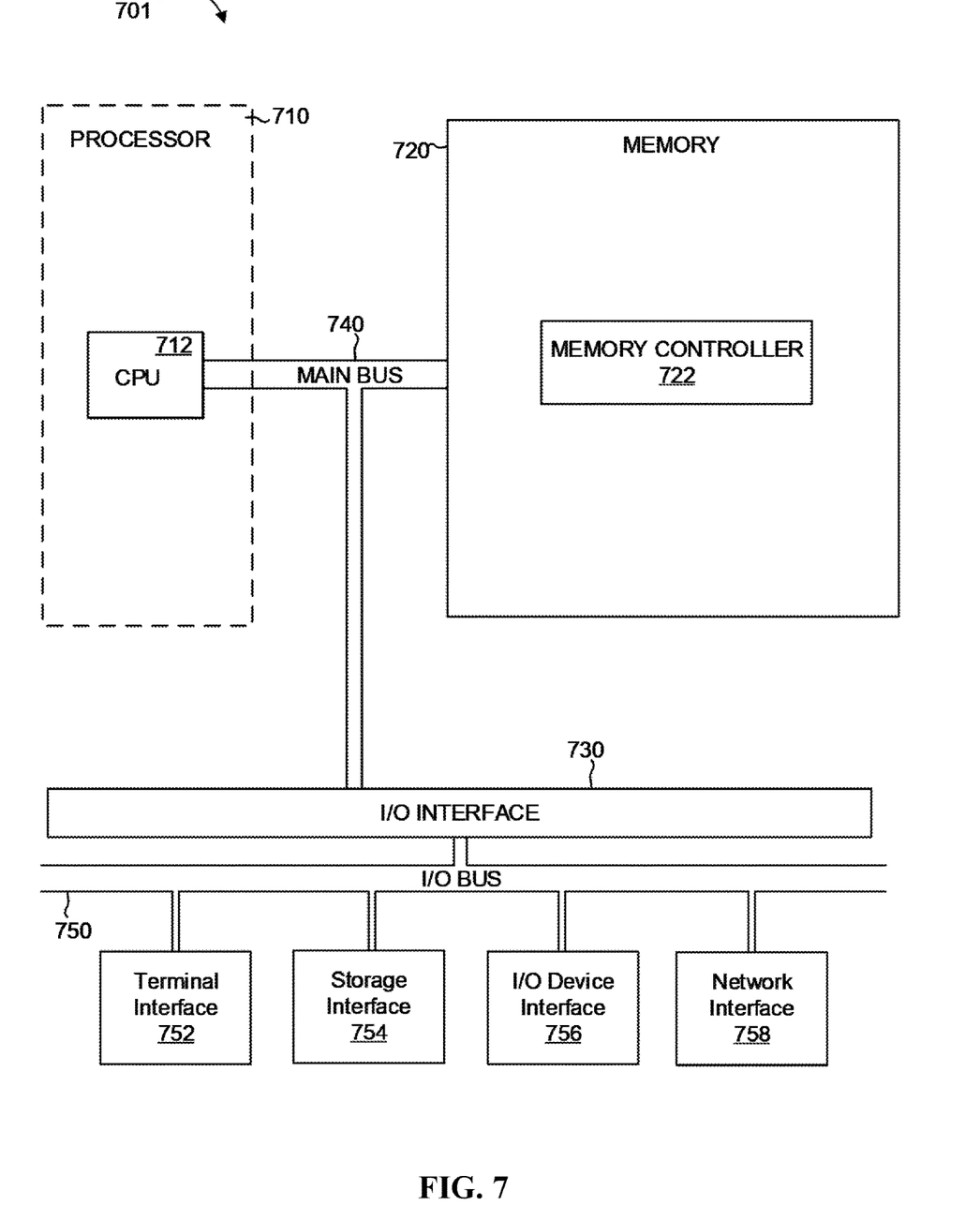
FIG. 7 depicts the representative major components of an example computer system having features that can be used in accordance with embodiments of the present disclosure.

FIG. 7 depicts the representative major components of an exemplary Computer System 701 having features that can be used in accordance with embodiments of the present disclosure. The particular components depicted are presented for the purpose of example only and are not necessarily the only such variations. The Computer System 701 can comprise a Processor 710, Memory 720, an Input/Output Interface (also referred to herein as I/O or I/o Interface) 730, and a Main Bus 740. The Main Bus 740 can provide communication pathways for the other components of the Computer System 701. In some embodiments, the Main Bus 740 can connect to other components such as a specialized digital signal processor (not depicted).

The Processor 710 of the Computer System 701 can be comprised of one or more CPUs 712. The Processor 710 can additionally be comprised of one or more memory buffers or caches (not depicted) that provide temporary storage of instructions and data for the CPU 712. The CPU 712 can perform instructions on input provided from the caches or from the Memory 720 and output the result to caches or the Memory 720. The CPU 712 can be comprised of one or more circuits configured to perform one or methods consistent with embodiments of the present disclosure. In some embodiments, the Computer System 701 can contain multiple Processors 710 typical of a relatively large system. In other embodiments, however, the Computer System 701 can be a single processor with a singular CPU 712.

The Memory 720 of the Computer System 701 can be comprised of a Memory Controller 722 and one or more memory modules for temporarily or permanently storing data (not depicted). In some embodiments, the Memory 720 can comprise a random-access semiconductor memory, storage device, or storage medium (either volatile or non-volatile) for storing data and programs. The Memory Controller 722 can communicate with the Processor 710, facilitating storage and retrieval of information in the memory modules. The Memory Controller 722 can communicate with the I/O Interface 730, facilitating storage and retrieval of input or output in the memory modules. In some embodiments, the memory modules can be dual in-line memory modules.

The I/O Interface 730 can comprise an I/O Bus 750, a Terminal Interface 752, a Storage Interface 754, an I/O Device Interface 756, and a Network Interface 758. The I/O Interface 730 can connect the Main Bus 740 to the I/O Bus 750. The I/O Interface 730 can direct instructions and data from the Processor 710 and Memory 720 to the various interfaces of the I/O Bus 750. The I/O Interface 730 can also direct instructions and data from the various interfaces of the I/O Bus 750 to the Processor 710 and Memory 720. The various interfaces can comprise the Terminal Interface 752, the Storage Interface 754, the I/O Device Interface 756, and the Network Interface 758. In some embodiments, the various interfaces can comprise a subset of the aforementioned interfaces (e.g., an embedded computer system in an industrial application may not include the Terminal Interface 752 and the Storage Interface 754).

Logic modules throughout the Computer System 701—including but not limited to the Memory 720, the Processor 710, and the I/O Interface 730—can communicate failures and changes to one or more components to a hypervisor or operating system (not depicted). The hypervisor or the operating system can allocate the various resources available in the Computer System 701 and track the location of data in Memory 720 and of processes assigned to various CPUs 712. In embodiments that combine or rearrange elements, aspects of the logic modules' capabilities can be combined or redistributed. These variations would be apparent to one skilled in the art.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
obtaining contact data corresponding to a set of contacts of an authorization card, the contact data indicating a sequence of engaged contacts among the set of contacts, wherein the set of contacts comprises multiple different shapes, wherein a portion of the set of contacts is disposed on and recessed from a first surface of the authorization card and wherein a second portion of the set of contacts is disposed on and recessed from a second surface of the authorization card, the first surface being opposite the second surface;
obtaining activation data corresponding to a sequence of predetermined engaged contacts among the set of contacts;
determining, by comparing the contact data to the activation data, that the sequence of engaged contacts matches the sequence of predetermined engaged contacts;
changing, in response to the determining, a state of the authorization card from an inactive state to an active state; and
permitting, in response to the changing the state, an electronic transfer of authorization data from the authorization card.

2. The method of claim 1, wherein the inactive state comprises the set of contacts preventing the electronic transfer of the authorization data, and
wherein the active state comprises the set of contacts permitting the electronic transfer of the authorization data.

3. The method of claim 1, wherein the authorization card comprises a circuit comprising an antenna,
wherein the inactive state comprises the circuit being an open circuit, and
wherein the active state comprises the circuit being a closed circuit.

4. The method of claim 1, wherein the determining further comprises identifying that a set of unengaged contacts among the set of contacts matches a set of predetermined unengaged contacts.

5. The method of claim 1, wherein the electronic transfer comprises a transmission of a RFID signal representing the authorization data from the authorization card.

6. The method of claim 1, wherein the authorization card is selected from a group consisting of a credit card and a debit card.

7. The method of claim 1, wherein each engaged contact of the sequence of engaged contacts is touched in successive order by a user.

8. The method of claim 1, wherein the changing the state comprises activating a visual indicator disposed on a surface of the authorization card.

9. The method of claim 1, wherein the changing the state comprises changing the state to the active state for a predetermined quantity time, and
in response to determining that the predetermined quantity of time is exceeded, transitioning the state from the active state to the inactive state.

10. The method of claim 1, wherein the set of contacts comprises push-button switches.

11. The method of claim 1, wherein the set of contacts comprises capacitive touch switches.

12. The method of claim 1, wherein the set of contacts comprises resistive touch switches.

13. The method of claim 1, further comprising:
emitting, in response to changing the state of the authorization card from the inactive state to the active state, an audio indication.

14. A system comprising:
one or more processors; and
one or more computer-readable storage media storing program instructions which, when executed by the one or more processors, are configured to cause the one or more processors to perform a method comprising:
obtaining contact data corresponding to a set of contacts of an authorization card, the contact data indicating a sequence of engaged contacts among the set of contacts, wherein the set of contacts comprises multiple different shapes, wherein a portion of the set of contacts is disposed on and recessed from a first surface of the authorization card and wherein a second portion of the set of contacts is disposed on and recessed from a second surface of the authorization card, the first surface being opposite the second surface;
obtaining activation data corresponding to a sequence of predetermined engaged contacts among the set of contacts;
determining, by comparing the contact data to the activation data, that the sequence of engaged contacts matches the sequence of predetermined engaged contacts;
changing, in response to the determining, a state of the authorization card from an inactive state to an active state; and
permitting, in response to the changing the state, an electronic transfer of authorization data from the authorization card.

15. The system of claim 14, wherein the inactive state comprises the set of contacts preventing the electronic transfer of the authorization data, and
wherein the active state comprises the set of contacts permitting the electronic transfer of the authorization data.

16. The system of claim 14, wherein the authorization card comprises a circuit comprising an antenna,
wherein the inactive state comprises the circuit being an open circuit, and
wherein the active state comprises the circuit being a closed circuit.

17. The system of claim 14, wherein the determining further comprises identifying that a set of unengaged contacts among the set of contacts matches a set of predetermined unengaged contacts.

18. The system of claim 14, wherein the electronic transfer comprises a transmission of a RFID signal representing the authorization data from the authorization card.

19. The system of claim 14, wherein each engaged contact of the sequence of engaged contacts is touched by a user.

20. A computer program product comprising one or more computer readable storage media, and program instructions collectively stored on the one or more computer readable storage media, the program instructions executable by one or more processors to cause the one or more processors to perform a method comprising:

- obtaining contact data corresponding to a set of contacts of an authorization card, the contact data indicating a sequence of engaged contacts among the set of contacts, each engaged contact of the sequence of engaged contacts touched in successive order by a user, wherein the set of contacts comprises multiple different shapes, wherein a portion of the set of contacts is disposed on and recessed from a first surface of the authorization card and wherein a second portion of the set of contacts is disposed on and recessed from a second surface of the authorization card, the first surface being opposite the second surface;
- obtaining activation data corresponding to a sequence of predetermined engaged contacts among the set of contacts;
- determining, by comparing the contact data to the activation data, that the sequence of engaged contacts matches the sequence of predetermined engaged contacts;
- changing, in response to the determining, a state of the authorization card from an inactive state to an active state; and
- permitting, in response to the changing the state, an electronic transfer of authorization data from the authorization card.

* * * * *